US008526880B2

(12) United States Patent
Foster (10) Patent No.: US 8,526,880 B2
(45) Date of Patent: Sep. 3, 2013

(54) COMMUNICATIONS DEVICE RESPONSIVE TO NEAR FIELD COMMUNICATIONS (NFC) TO ENTER LOCKED OR UNLOCKED OPERATING MODES (75) Inventor: Brett Foster, Kitchener (CA)

(73) Assignee: Blackberry Limited, Waterloo, Ontario (CA)

( * ) Notice: Subject to any disclaimer, the term of this patent is extended or adjusted under 35 U.S.C. 154(b) by 703 days.

(21) Appl. No.: 12/713,203

(22) Filed: Feb. 26, 2010

(65) Prior Publication Data

US 2011/0212687 A1  Sep. 1, 2011

(51) Int. Cl.
*H04B 5/00* (2006.01)

(52) U.S. Cl.
USPC ...... 455/41.1; 455/556.2; 455/557; 455/90.3; 455/575; 455/41.2; 455/411; 455/414.1; 370/302; 370/345; 370/480; 713/65; 713/185

(58) Field of Classification Search
USPC .................... 455/41.1, 41.2, 410, 411, 414.1, 455/556.2, 90.3, 575, 557; 713/65, 185; 370/302, 295, 343, 480
See application file for complete search history.

(56) References Cited

U.S. PATENT DOCUMENTS

| | | | | |
|---|---|---|---|---|
| 5,796,827 A * | 8/1998 | Coppersmith et al. | ........ | 713/182 |
| 6,864,780 B2 * | 3/2005 | Doi et al. | ...................... | 340/5.64 |
| 7,076,267 B2 | 7/2006 | Vander Veen et al. | ..... | 455/550.1 |
| 7,231,226 B2 | 6/2007 | Vander Veen et al. | ..... | 455/550.1 |
| 7,454,239 B2 | 11/2008 | Infanti | ........................ | 455/575.8 |
| 7,555,326 B2 | 6/2009 | Infanti | ........................ | 455/575.8 |
| 7,590,384 B2 * | 9/2009 | Dawidowsky | ............... | 455/41.1 |
| 7,647,024 B2 * | 1/2010 | Wang et al. | ................... | 455/41.2 |
| 7,733,224 B2 * | 6/2010 | Tran | .............................. | 340/540 |
| 7,899,492 B2 * | 3/2011 | Wang et al. | ................ | 455/556.1 |
| 7,907,954 B2 * | 3/2011 | Poyhonen et al. | ............ | 455/454 |
| 7,948,925 B2 * | 5/2011 | Miyabayashi et al. | ........ | 370/302 |
| 7,952,512 B1 * | 5/2011 | Delker et al. | .................... | 342/42 |
| 7,957,733 B2 * | 6/2011 | Wang et al. | ................ | 455/426.2 |
| 7,978,063 B2 * | 7/2011 | Baldus et al. | ............ | 340/539.12 |
| 7,999,655 B2 * | 8/2011 | Yoshikawa | ................... | 340/5.72 |
| 8,235,293 B2 * | 8/2012 | Yu et al. | ................... | 235/462.13 |
| 2008/0012706 A1 | 1/2008 | Mak-Fan et al. | ............ | 340/568.1 |
| 2008/0082025 A1 | 4/2008 | Hughes et al. | ................ | 600/595 |
| 2008/0191905 A1 | 8/2008 | Martin et al. | .................... | 341/24 |
| 2009/0029750 A1 | 1/2009 | Infanti | ........................ | 455/575.8 |
| 2009/0291634 A1 * | 11/2009 | Saarisalo | ..................... | 455/41.1 |
| 2009/0312000 A1 | 12/2009 | Wakefield et al. | ............ | 455/418 |
| 2011/0070827 A1 * | 3/2011 | Griffin et al. | ................ | 455/41.1 |
| 2011/0070828 A1 * | 3/2011 | Griffin et al. | ................ | 455/41.1 |

* cited by examiner

FOREIGN PATENT DOCUMENTS

| | | |
|---|---|---|
| EP | 1879364 | 1/2008 |
| EP | 1959332 | 8/2008 |
| JP | 11186929 | 7/1999 |

*Primary Examiner* — Marceau Milord
(74) *Attorney, Agent, or Firm* — Allen, Dyer, Doppelt, Milbrath & Gilchrist, P.A. Attorneys at Law (57) ABSTRACT

A communications device includes a housing and radio frequency (RF) circuitry and a processor carried by the housing and operative with each other. A Near Field Communications (NFC) circuit is carried by the housing and connected to the processor. This circuit is configured to detect an NFC enabled tag using an NFC communications protocol when the device is positioned near the tag. The circuit generates a disable signal to the processor upon detecting the NFC enabled tag. The processor is configured to cause the device to enter a locked, operating mode upon receiving the disable signal and to enter or remain in an unlocked, operating mode if the NFC circuit does not generate a disable signal indicative that the NFC circuit has not detected the NFC enabled tag.

25 Claims, 7 Drawing Sheets

PHONE OUT OF POCKET: PHONE DOES NOT READ (DETECT) THE NFC TAG IN THE POCKET AND THE PHONE IS NO LONGER IN THE HOLSTERED MODE (PHONE IS ENABLED AND NOT IN IDLE, i.e., LOCKED OPERATING MODE)

PHONE IN POCKET: THE PHONE READS (DETECTS) THE NFC TAG IN THE POCKET AND AUTOMATICALLY ENTERS THE HOLSTERED MODE (PHONE IS DISABLED AND IN AN IDLE STATE, i.e., LOCKED OPERATING MODE)

COMMUNICATIONS DEVICE RESPONSIVE TO NEAR FIELD COMMUNICATIONS (NFC) TO ENTER LOCKED OR UNLOCKED OPERATING MODES

FIELD

This device and method relates to the field of communications devices, and more particularly, to communications devices that use Near Field Communications (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, etc. These multi-function devices usually allow users to send and receive electronic mail (email) messages wirelessly and access the internet via a cellular network and/or a wireless local area network (WLAN), for example.

Some mobile devices incorporate contactless card technology and/or Near Field Communication chips. Near Field Communication technology is commonly used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communication technology exchanges data between devices over a short distance, such as only a few centimeters.

Some mobile wireless communications devices are designed to be inserted into a holster. Specially placed magnets trigger a sensor in the mobile wireless communications device to place the device in a holstered mode in which the phone is disabled and in an idle state, i.e., a locked, operating mode.

BRIEF DESCRIPTION OF THE DRAWINGS

Other objects, features and advantages will become apparent from the detailed description which follows when considered in light of the accompanying drawings in which.

DETAILED DESCRIPTION

Different embodiments will now be described more fully hereinafter with reference to the accompanying drawings, in which various embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

A communications device is formed in one example as mobile wireless communications device and includes a housing and radio frequency (RF) circuitry and a processor carried by the housing and operative with each other. A Near Field Communications (NFC) circuit is carried by the housing and connected to the processor. This circuit is configured to detect an NFC enabled tag using the NFC communications protocol. For example, the NFC enabled tag could be secured in a pocket of clothing and the communications device is inserted into the pocket and enabled. The circuit generates a disable signal to the processor upon detecting the NFC enabled tag. The processor is configured to cause the device to enter a locked, operating mode upon receiving the disable signal generated from the NFC circuit and to enter or remain in an unlocked, operating mode if the NFC circuit does not generate a disable signal, indicating that the device has not detected the NFC enabled tag.

In one aspect, the NFC circuit includes a timing circuit configured to operate the NFC circuit at intervals to detect the NFC enabled tag. This use of the timing circuit can be configured to operate the NFC circuit at intervals of about every 1-4 seconds. This will save battery power for the mobile wireless communications device. Only a few milliseconds of time are actually required to scan or read the NFC enabled tag. The 1-4 seconds corresponds in one example to an amount of time required take the phone out of a pocket and bring to the face of the user and activate the phone into the unlocked, operating mode.

In another aspect, the housing is configured for handheld operation. A circuit board can be carried by the housing and the processor can be mounted on the circuit board. The RF circuitry can be mounted on the circuit board. In another aspect, the NFC circuit comprises an NFC integrated circuit chip mounted on the circuit board. An antenna is mounted within the housing and connected to the RF circuitry.

A method aspect and an article of clothing are also set forth.

The mobile wireless communications device and method address a problem of undesirable side effects of placing the device in one's pocket or other device area rather than in its holster. This solves a technical problem associated with "pocket dialing" that may occur when buttons are accidentally pressed, and consequently, calls or transmissions are inadvertently made.

Figure 1:
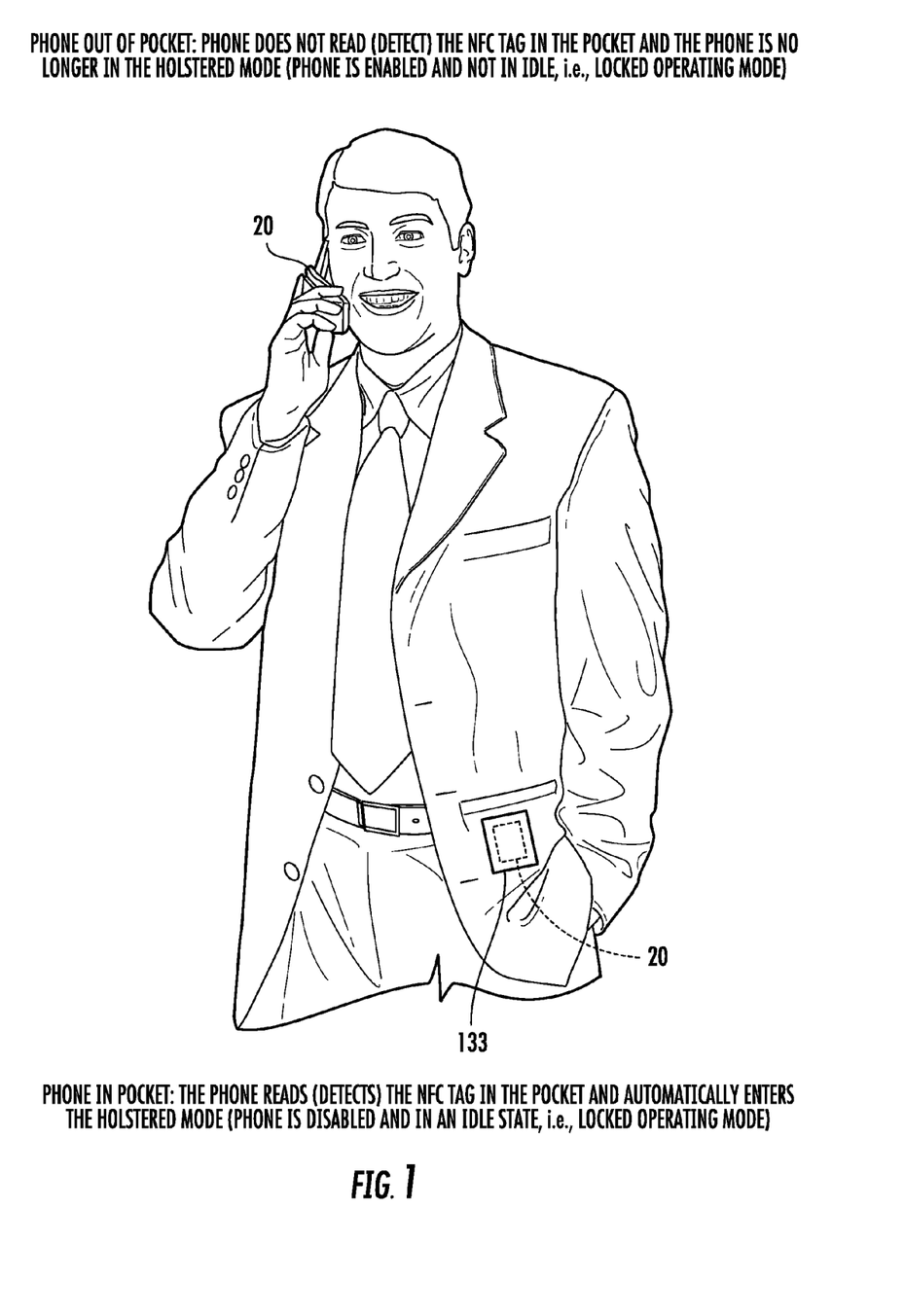
FIG. 1 is a fragmentary view of a person holding a mobile wireless communications device and in the unlocked, operating mode and showing by dashed lines the device optionally inserted within a pocket of the user's clothing and the device in the locked, operating mode.

FIG. 1 is a general fragmentary view of a user holding the mobile wireless communications device indicated generally at 20. The device does not read or detect the NFC tag, which is located in the pocket of the user's clothing. The device is thus no longer in a holstered or locked, operating mode and is instead in the enabled, i.e., unlocked, operating mode. When the device or phone 20 is inserted in the pocket, the device 20 reads (or detects) the NFC tag 133 in the pocket and automatically enters the holstered mode such that the device or phone is disabled and in an idle state, i.e., locked, operating mode. The NFC tags provide greater flexibility and coverage. Depending on the type of antenna used on the mobile wireless communications device and NFC tag, the distance between the receiver and NFC tag is increased over that of typical magnets as used with a holster. With this greater flexibility, the pocket itself is turned into a holster. In effect, any space can be turned into a holster.

The NFC tag in one example is inserted in a clip or key fob in the pocket of the user. It is also possible to embed the NFC tag directly in clothing. In another example, the NFC tag is placed in a purse because typically users that carry purses will often place the device in the purse without placing it into a holster. Another location is to place the NFC tag in a desk drawer. It is also possible to customize the type of profile used depending on where the user places the NFC tag. For example, if the NFC tag is placed on a nightstand and the user places the device on the nightstand, the device goes silent, but if the device is placed in the user's purse and the NFC tag is in the purse, the device may be configured to ring. When placed in a pants pocket tag, however, the device may be configured to vibrate.

The mobile wireless communications device in one example times periodic polling to the NFC tag to detect when the device has been removed from the holster. In one case, the polling occurs once every one to about four seconds as noted above. This allows power saving with this type of scanning. As opposed to or in addition to regular scanning, the device in another example scans based on input stimulus. Assuming the device is periodically engaged either on purpose by the user or by accident, the device in this example scans when an input is activated to determine if it is still within the distance of the NFC tag.

Near Field Communication (NFC) technology is an extension of the ISO 14443 proximity-card standard as a contactless card, RF-ID standard that incorporates the interface of a smart card and a reader into one device. A NFC device such as a mobile phone typically includes an NFC integrated circuit (IC) chip that communicates with both existing ISO 14443 smart cards and readers and other NFC devices and compatible with any existing contactless infrastructure. The NFC IC chips use magnetic field induction where two loop antennas are located near each other and form an air-core transformer. The technology operates on the unlicensed radio frequency ISM band of about 13.56 MHz and has a bandwidth of about 2 MHz. The working distance is usually about 0 to 20 centimeters and a user of the NFC device touches another NFC device or tag to initiate communication, with data rates ranging from 106 to about 424 kbit/s. Most mobile wireless communications devices operate in an active communications mode using a modified Miller and 100% amplitude shift keyed (ASK) code unless a passive mode is used in which a Manchester and ASK code is used. Further details are set forth in the Mobile NFC Technical Guidelines, Version 2.0, November 2007 by GSMA, the disclosure which is hereby incorporated by reference in its entirety.

Figure 2:
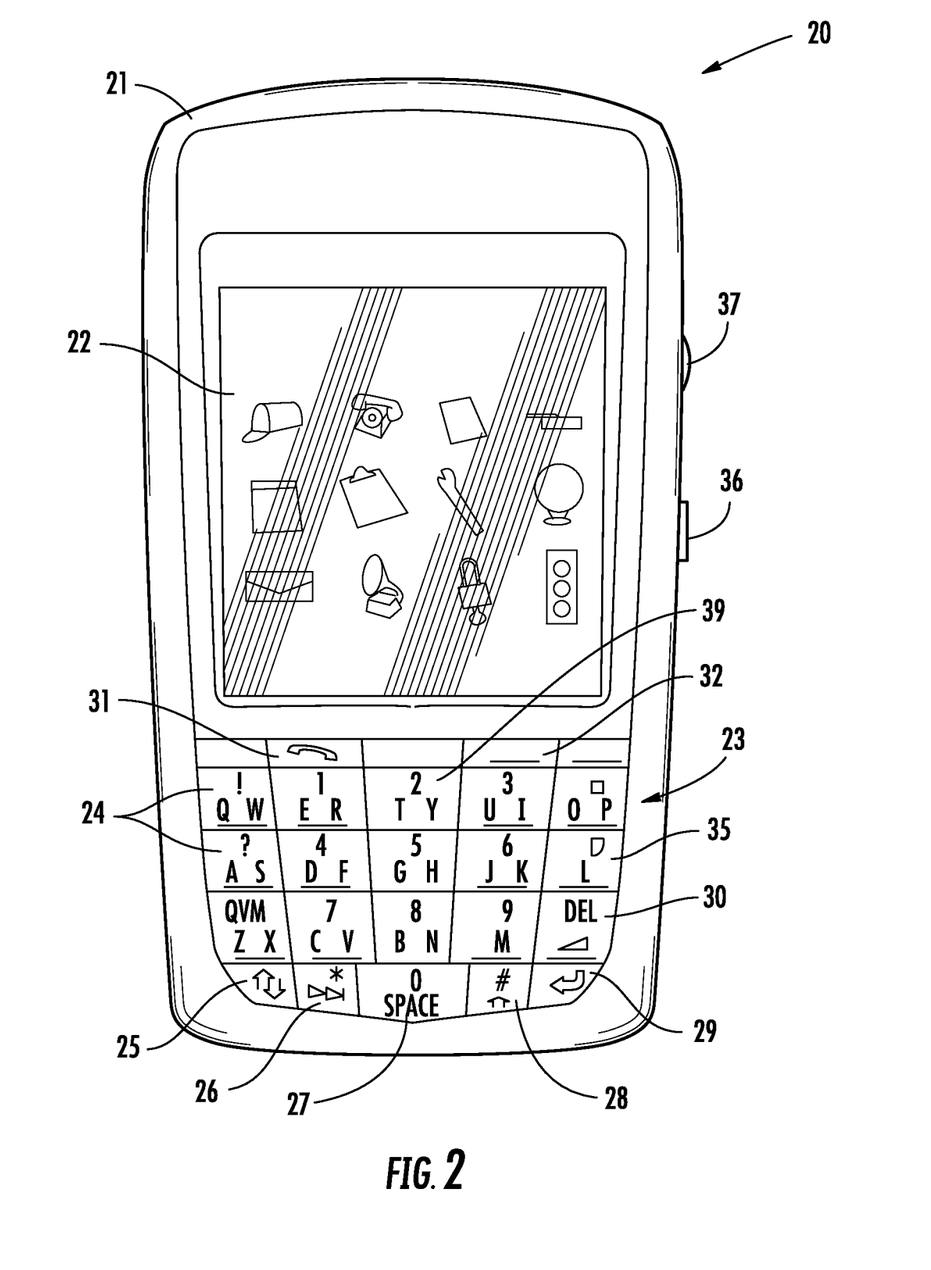
FIG. 2 is a schematic block diagram of an example of a mobile wireless communications device configured as a handheld device that can be used in accordance with non-limiting examples and illustrating basic internal components thereof in accordance with a non-limiting example.
Figure 3:
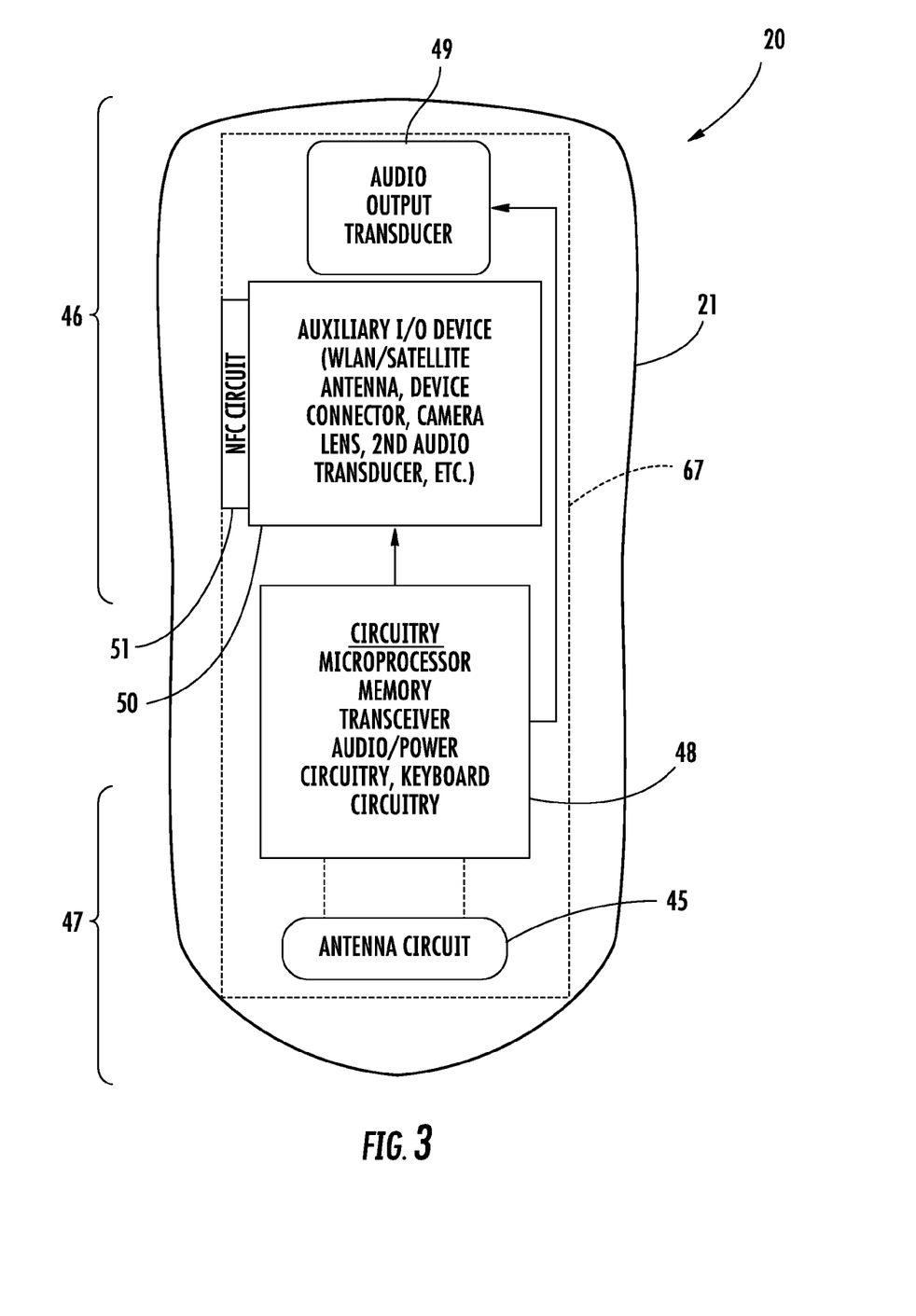
FIG. 3 is a front elevation view of the mobile wireless communications device of FIG. 2 in accordance with a non-limiting example.

A brief description will now proceed relative to FIGS. 2-3, which disclose an example of a mobile wireless communications device, for example, a portable cellular radio, which can incorporate non-limiting examples of various circuits that can be used with the Near Field Communications circuitry as will be described in greater detail below. FIGS. 2-3 are representative non-limiting examples of the many different types of functional circuit components and their interconnection, and operative for use with the Near Field Communications circuitry.

Referring to FIGS. 2 and 3, an example of a mobile wireless communications device 20, such as a portable cellular radio is first described. This device 20 illustratively includes a housing 21 having an upper portion 46 and a lower portion 47, and a dielectric substrate (i.e., circuit board) 67, such as a conventional printed circuit board (PCB) substrate, for example, carried by the housing as shown in FIG. 3. It should be understood that one or more circuit boards can be used. The NFC circuit is shown in FIG. 3 at 51 and could be on one circuit board and the processor and other circuitry on another circuit board. A housing cover (not shown in detail) would typically cover the front portion of the housing. The term circuit board 67 as used hereinafter can refer to any dielectric substrate, PCB, ceramic substrate or other circuit carrying structure for carrying signal circuits and electronic components within the mobile wireless communications device 20. The illustrated housing 21 is a static housing, for example, as opposed to a flip or sliding housing which are used in many cellular telephones. However, these flip, sliding and other housing configurations may also be used.

Circuitry 48 is carried by the circuit board 67, such as a microprocessor, memory, one or more wireless transceivers (e.g., cellular, WLAN, etc.), which includes RF circuitry, including audio and power circuitry, including any keyboard circuitry. It should be understood that keyboard circuitry could be on a separate keyboard, etc., as will be appreciated by those skilled in the art. A battery (not shown) is also carried by the housing 21 for supplying power to the circuitry 48. The term RF circuitry could encompass the interoperable RF transceiver circuitry, power circuitry and audio circuitry.

Furthermore, an audio output transducer 49 (e.g., speaker) is carried by an upper portion 46 of the housing 21 and connected to the circuitry 48. One or more user input interface devices, such as a keypad (keyboard) 23 (FIG. 2), is also carried by the housing 21 and connected to the circuitry 48. The term keypad as used herein also refers to the term keyboard, indicating the user input devices having lettered and/or numbered keys commonly known and other embodiments, including multi-top or predictive entry modes. Other examples of user input interface devices include a scroll wheel 37 and a back button 36. Of course, it will be appreciated that other user input interface devices (e.g., a stylus or touch screen interface) may be used in other embodiments.

An antenna 45 in this example is positioned at the lower portion 47 in the housing and can be formed as a pattern of conductive traces that make an antenna circuit, which physically forms the antenna. It is connected to the circuitry 48 on the main circuit board 67. In one non-limiting example, the antenna could be formed on an antenna circuit board section that extends from the main circuit board at the lower portion of the housing. Also, a separate keyboard circuit board could be used.

Another benefit of the illustrated configuration is that it provides more room for one or more auxiliary input/output (I/O) devices 50 to be carried at the upper portion 46 of the housing. Furthermore, by separating the antenna 45 from the auxiliary I/O device(s) 50, this may allow for reduced interference therebetween.

Some examples of auxiliary I/O devices 50 include a WLAN (e.g., Bluetooth, IEEE 802.11) antenna for providing WLAN communication capabilities, and/or a satellite positioning system (e.g., GPS, Galileo, etc.) antenna for providing position location capabilities, as will be appreciated by those skilled in the art. Other examples of auxiliary I/O devices 50 include a second audio output transducer (e.g., a speaker for speaker phone operation), and a camera lens for providing digital camera capabilities, an electrical device connector (e.g., USB, headphone, secure digital (SD) or memory card, etc.).

It should be noted that the term "input/output" as used herein for the auxiliary I/O device(s) 50 means that such devices may have input and/or output capabilities, and they need not provide both in all embodiments. That is, devices such as camera lenses may only receive an optical input, for example, while a headphone jack may only provide an audio output.

As illustrated in FIG. 3, a separate NFC circuit chip 51 is associated with other input/output devices and is operably connected to the processor. As noted above, upon detecting the NFC tag (also referred to as an NFC enabled tag), this circuit 51 generates a disable signal (or other signal) to the processor, which is configured to cause the device 20 to enter a locked, operating mode, also termed the holstered or idle mode. In this manner, "pocket dialing" will not occur.

The device 20 further illustratively includes a display 22, for example, a liquid crystal display (LCD) carried by the housing 21 and connected to the circuitry 48. A back button 36 and scroll wheel 37 may be connected to the circuitry 48 for allowing a user to navigate menus, text, etc., as will be appreciated by those skilled in the art. The scroll wheel 37 may also be referred to as a "thumb wheel" or a "track wheel" in some instances. In other embodiments, a trackball or trackpad or touch screen may be used for pointing and navigation. The keypad 23 illustratively includes a plurality of multi-symbol keys 24 each having indicia of a plurality of respective symbols thereon. The keypad 23 also illustratively includes an alternate function key 25, a next key 26, a space key 27, a shift key 28, a return (or enter) key 29, and a backspace/delete key 30.

The next key 26 is also used to enter a "*" symbol upon first pressing or actuating the alternate function key 25. Similarly, the space key 27, shift key 28 and backspace key 30 are used to enter a "0" and "#", respectively, upon first actuating the alternate function key 25. The keypad 23 further illustratively includes a send key 31, an end key 32, and a convenience (i.e., menu) key 39 for use in placing cellular telephone calls, as will be appreciated by those skilled in the art.

Moreover, the symbols on each key 24 are arranged in top and bottom rows. The symbols in the bottom rows are entered when a user presses a key 24 without first pressing the alternate function key 25, while the top row symbols are entered by first pressing the alternate function key. As seen in FIG. 2, the multi-symbol keys 24 are arranged in the first three rows on the keypad 23 below the send and end keys 31, 32. Furthermore, the letter symbols on each of the keys 24 are arranged to define a QWERTY layout. That is, the letters on the keypad 23 are presented in a three-row format, with the letters of each row being in the same order and relative position as in a standard QWERTY keypad.

Each row of keys (including the fourth row of function keys 25-29) is arranged in five columns. The multi-symbol keys 24 in the second, third, and fourth columns of the first, second, and third rows have numeric indicia thereon (i.e., 1 through 9) accessible by first actuating the alternate function key 25. Coupled with the next, space, and shift keys 26, 27, 28, which respectively enter a "*", "0", and "#" upon first actuating the alternate function key 25, as noted above, this set of keys defines a standard telephone keypad layout, as would be found on a traditional touch-tone telephone, as will be appreciated by those skilled in the art.

Accordingly, the mobile wireless communications device 20 as described is advantageously used not only as a traditional cellular phone, but also conveniently used for sending and/or receiving data over a cellular or other network, such as Internet and email data, for example. Of course, other keypad configurations are used in other embodiments. Multi-tap or predictive entry modes are used in another example for typing e-mails, etc. as will be appreciated by those skilled in the art.

The antenna 45 may be formed as a multi-frequency band antenna, which provides enhanced transmission and reception characteristics over multiple operating frequencies. More particularly, the antenna 45 is designed to provide high gain, desired impedance matching, and meet applicable SAR requirements over a relatively wide bandwidth and multiple cellular frequency bands. By way of example, the antenna 45 may operate over five bands, namely a 850 MHz Global System for Mobile Communications (GSM) band, a 900 MHz GSM band, a DCS band, a PCS band, and a WCDMA band (i.e., up to about 2100 MHz), although it may be used for other bands/frequencies as well. To conserve space, the antenna 45 may advantageously be implemented in three dimensions although it may be implemented in two-dimensional or planar embodiments as well.

In accordance with some embodiments, the mobile wireless communications device shown in FIGS. 2 and 3 incorporates e-mail and messaging accounts and provides different functions such as composing e-mail, PIN messages, and SMS messages. The device manages messages through an appropriate menu that are retrieved by choosing a messages icon. An address book function adds contacts, allows management of an address book, sets address book options and manages SIM card phone books. A phone menu allows for the making and answering of phone calls using different phone features, managing phone call logs, setting phone options, and viewing phone information. A browser application permits the browsing of web pages, configuring a browser, adding bookmarks, and changing browser options. Other applications include a task, memo pad, calculator, alarm and games, as well as handheld options with various references.

A calendar icon can be chosen for entering a calendar program that can be used for establishing and managing events such as meetings or appointments. The calendar program in one example is any type of messaging or appointment/meeting program that allows an organizer to establish an event, for example, an appointment or meeting.

A non-limiting example of various functional components that are used in the exemplary mobile wireless communications device 20 of FIGS. 2 and 3 is further described in the example below with reference to FIG. 4 and with reference to greater details of NFC.

The NFC protocol operates within the globally available and unregulated radio frequency band of 13.56 MHz and has a working distance of up to 20 centimeters. Three data rates are typically available: 106 kilobits per second (kbit/s), 212 kbit/s, and 424 kbit/s. As noted before, two modes of communication are currently available: a passive communication mode and an active communication mode. In the passive communication mode, the initiator device provides an electromagnetic carrier field and the target device answers the initiator device by modulating the carrier field. In the passive communication mode, the target device may draw operating power from the carrier field provided by the initiator device. Advantageously, only the initiator device is required to have a power supply. The modulating magnetic field created by the target device could be used for communicating a limited amount of data.

In the active communication mode, both the initiator device and the target device generate their own electromagnetic field. The initiator device starts the NFCIP-1 communication. The target device can respond to a command received from the initiator device in the active communication mode by modulating the electromagnetic field generated by the target device. Typically, in the active communication mode, both devices require a power supply.

Notably, in the active communication mode, both devices can act as either initiator or target, while this is not the case in the passive communication mode, wherein the device without the ability to create an electromagnetic carrier field cannot be an initiator device and instead becomes the target device.

According to NFCIP-1, responsive to sensing modulation of the initiator electromagnetic carrier field by the target device, the initiator device performs an initial collision avoidance sequence by transmitting an ATR_REQ (attribute request) command to the target device. Responsive to receiving the ATR_REQ (attribute request) command, the target device transmits a response called ATR_RES (attribute response).

A non-limiting example of various functional components that can be used in the exemplary mobile wireless communications device 100 is further described in the example below with reference to FIG. 4. The device 100 illustratively includes a housing 120, a keypad 140 and an output device 160. The output device 160 as shown includes a display, which may comprise a full graphic LCD and could be touch sensitive as an input device. Other types of output devices may alternatively be used. A processing device 180 is contained within the housing 120 and is coupled between the keypad 140 and the display 160. This device 180 is typically a microprocessor chip contained on a circuit board in the housing 120. If the display is a touch activated display, the keypad may not be necessary. The processing device 180 controls the operation of the display 160, as well as the overall operation of the mobile device 100, in response to actuation of keys on the keypad 140 by the user.

The housing 120 may be elongated vertically, or may take on other sizes and shapes (including clamshell housing structures). The keypad may include a mode selection key, or the device may include other hardware or software for switching between text entry and telephony entry.

Figure 4:
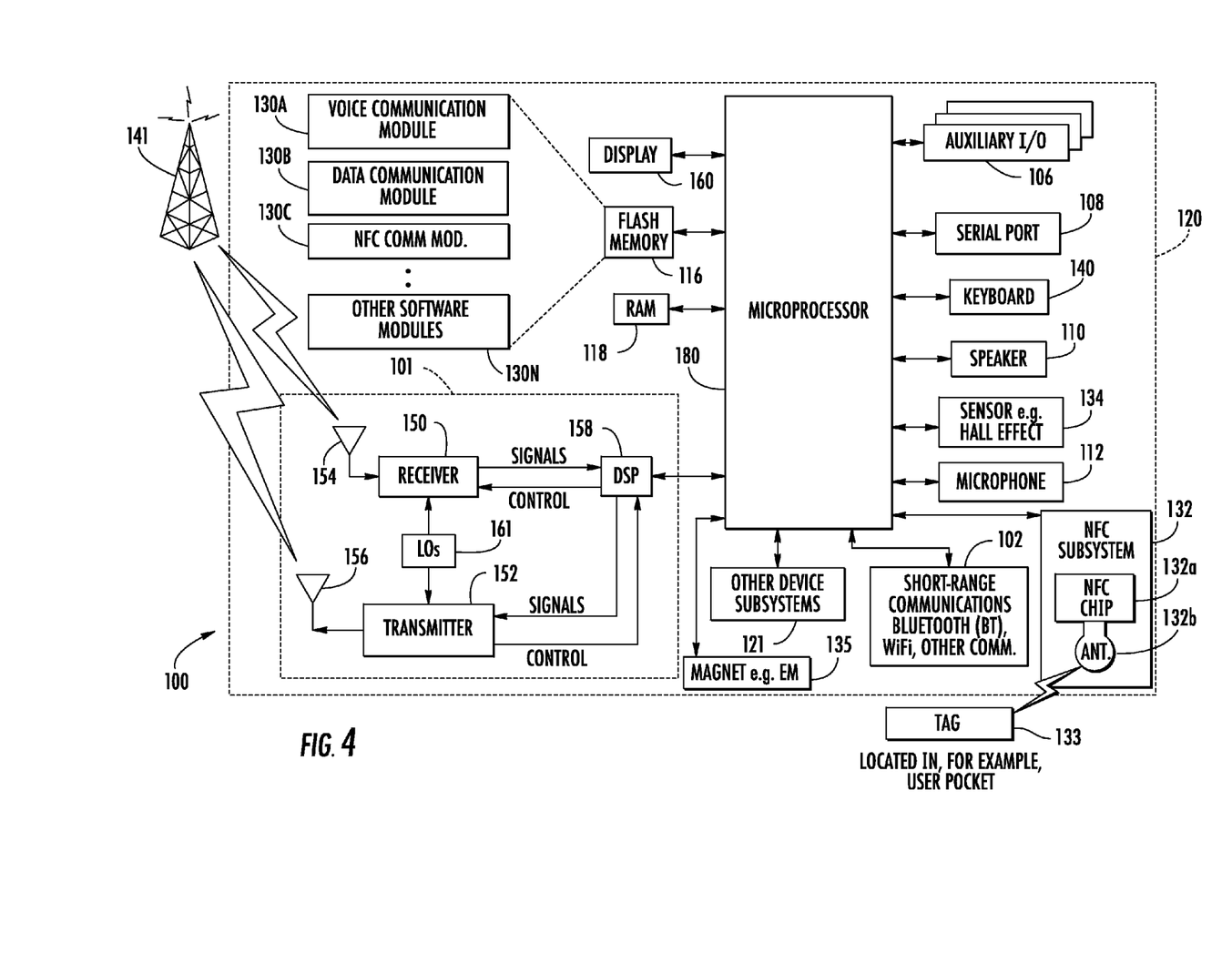
FIG. 4 is a schematic block diagram showing basic functional circuit components that can be used in the mobile wireless communications device of FIGS. 2 and 3.

In addition to the processing device 180, other parts of the mobile device 100 are shown schematically in FIG. 4. These include a communications subsystem 101; a short-range communications subsystem 102; the keypad 140 and the display 160, along with other input/output devices 106, 108, 110 and 112; as well as memory devices 116, 118 and various other device subsystems 121. The mobile device 100 in various embodiments is a two-way RF communications device having voice and data communications capabilities using RF circuitry. In addition, the mobile device 100 has the capability to communicate with other computer systems via the Internet. The short-range communications subsystem 102 includes a Bluetooth (BT) communications module for establishing a Bluetooth wireless connection and other communications modules such as an infrared module or device, WiFi circuit and module, and associated components and circuits as part of RF circuitry.

Operating system software executed by the processing device 180 is stored in a persistent store, such as the flash memory 116, but may be stored in other types of memory devices, such as a read only memory (ROM) or similar storage element. In addition, system software, specific device applications, or parts thereof, are temporarily loaded into a volatile store, such as the random access memory (RAM) 118. Communications signals received by the mobile device are also stored in the RAM 118.

The processing device 180, in addition to its operating system functions, enables execution of software applications 130a-130n on the device 100. A predetermined set of applications that control basic device operations, such as data and voice communications 130a and 130b, may be installed on the device 100 during manufacture. A Near Field Communications module 130C is also installed as illustrated.

The NFC communications module 130c as a software module cooperates with the microprocessor 180 through the flash memory 116. The microprocessor 180 operates also with the NFC subsystem 132 that includes a NFC chip 132a and antenna 132b that communicates with another device/NFC enabled tag 133 and can read or detect the NFC enabled tag 133 to cause the device 100 to enter the holstered or locked, operating mode. The antenna 132b in another example is a multiple antenna circuit having multiple antennas for operation. For example, an antenna is positioned at the front of the housing and another antenna is positioned at the back of the housing for full coverage. The NFC communications module 130c allows the microprocessor to control the NFC subsystem 132, which includes the NFC chip 132a and antenna 132b that, in one example, is tuned typically for 13.56 MHz. The NFC chip 132a is for example, a PN531 microcontroller-based transmission module from the Phillips Semiconductor Branch of Koninklijke Phillips Electronics N.V. When the NFC chip is a PN531 module, the NFC chip 132a includes analog circuitry and a contact list Universal Asynchronous Receiver Transmitter (UART), a core and a set of host interfaces. The analog circuitry includes an output driver, an integrated demodulator, a bit decoder, a mode detector and an RF-level detector. The contact list UART includes elements for data processing, Cyclical Redundancy Checking (CFC), parity generation, framing generation and check bit coding and decoding. The core typically includes an 80051 microcontroller, 32 Kbyte of ROM and one Kbyte of RAM. A set of host interfaces interface with the microprocessor and interface according to such known standards as I2C, serial UART, SPI and USE.

A magnetic sensor 134 is included and in one example is formed as a Hall Effect sensor and connected to the microprocessor 180. It includes the various components that operate as a Hall Effect sensor, including any necessary coils or other circuits. There is also illustrated a magnet 135 that is formed as an electromagnet and operates with the microprocessor to allow a different communications pathway using electromagnetic energy that is changed to correspond to changing data. The magnet 135 could operate to form another communications protocol pathway. Thus, this magnet 135 could have different functions, including working as a passive device in association with other components of the device 100 as illustrated. Other software modules 130n could include software that interoperates with the environment sensor 134 and any magnet or electromagnet 135 or other magnetic circuitry that could be included within the overall magnet circuit or structure 135.

In addition, a personal information manager (PIM) application may be installed during manufacture. The PIM is capable of organizing and managing data items, such as email, calendar events, voice mails, appointments, and task items. The PIM application is also capable of sending and receiving data items via a wireless network 141. The PIM data items are seamlessly integrated, synchronized and updated via the wireless network 141 with the device user's corresponding data items stored or associated with a host computer system.

Communication functions, including data and voice communications, are performed through the communications subsystem 101, and possibly through the short-range communications subsystem 120, which are part of RF circuitry contained on a circuit board typically as shown by the outline. The communications subsystem 101 includes a receiver 150, a transmitter 152, and one or more antennae 154 and 156. In addition, the communications subsystem 101 also includes a processing module, such as a digital signal processor (DSP) 158, and local oscillators (LOs) 161 as part of RF circuitry in this example. The specific design and implementation of the communications subsystem 101 is dependent upon the communications network in which the mobile device 100 is intended to operate. For example, the mobile device 100 may include a communications subsystem 101 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be used with the mobile device 100.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 100 may send and receive communications signals over the communication network 141. Signals received from the communications network 141 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communications functions, such as demodulation and decoding. In a similar manner, signals to be transmitted to the network 141 are processed (e.g., modulated and encoded) by the DSP 158 and are then provided to the transmitter 152 for digital to analog conversion, frequency up conversion, filtering, amplification and transmission to the communication network 141 (or networks) via the antenna 156.

In addition to processing communications signals, the DSP 158 provides for control of the receiver 150 and the transmitter 152. For example, gains applied to communications signals in the receiver 150 and transmitter 152 may be adaptively controlled through automatic gain control algorithms implemented in the DSP 158.

In a data communications mode, a received signal, such as a text message or web page download, is processed by the communications subsystem 101 and is input to the processing device 180. The received signal is then further processed by the processing device 180 for an output to the display 160, or alternatively to some other auxiliary I/O device 106. A device user may also compose data items, such as e-mail messages, using the keypad 140 and/or some other auxiliary I/O device 106, such as a touchpad, a rocker switch, a thumb-wheel, or some other type of input device. The composed data items may then be transmitted over the communications network 141 via the communications subsystem 101.

In a voice communications mode, overall operation of the device is substantially similar to the data communications mode, except that received signals are output to a speaker 110, and signals for transmission are generated by a microphone 112. Alternative voice or audio I/O subsystems, such as a voice message recording subsystem, may also be implemented on the device 100. In addition, the display 160 may also be used in voice communications mode, for example to display the identity of a calling party, the duration of a voice call, or other voice call related information and whether there are NFC communications or a Bluetooth connection.

Any short-range communications subsystem enables communication between the mobile device 100 and other proximate systems or devices, which need not necessarily be similar devices. For example, the short-range communications subsystem may include an infrared device and associated circuits and components as described above, or a Bluetooth communications module to provide for communication with similarly-enabled systems and devices as well as the NFC communications.

It should be understood that GSM is a communications system that uses a radio interface that can have an uplink frequency band and downlink frequency band with about 25 MHz bandwidth, typically subdivided into 124 carrier frequency channels, each spaced about 200 KHz apart as non-limiting examples. Time division multiplexing is used to allow about 8 speech channels per radio frequency channel, giving 8 radio time slots and 8 burst periods grouped into what is called a TDMA frame. For example, a channel data rate could be about 270.833 Kbps and a frame duration of about 4.615 milliseconds (MS) in one non-limiting example. The power output can vary from about 1 to about 2 watts.

Typically, linear predictive coding (LPC) is used to reduce the bit rate and provide parameters for a filter to mimic a vocal track with speech encoded at about 13 Kbps. Four different cell sizes can be used in a GSM network, including macro, micro, pico and umbrella cells. A base station antenna can be installed on a master building above the average rooftop level in a macrocell. In a microcell, the antenna height can be under the average rooftop level and used in urban areas. Microcells typically have a diameter of about a few dozen meters and are used indoors. Umbrella cells can cover shadowed regions or smaller cells. Typically, the longest distance for the GSM specification covered by an antenna is about 22 miles depending on antenna height, gain and propagation conditions.

GSM systems typically include a base station subsystem, a network and switching subsystem, and a General Packet Radio Service (GPRS) core network. A subscriber identify module (SIM) is usually implemented in the communications device, for example, the well known SIM card, similar to a smart card containing the subscription information and phone book of a user. The user can also switch handsets or could change operators by changing a SIM. USIM and RUIM and other similar technologies can be used.

The GSM signaling protocol has three general layers. Layer 1 is a physical layer using channel structures above the air interface. Layer 2 is the data link layer. Layer 3 is a signaling protocol, which includes three sublayers. These include a Radio Resources Management sublayer to control the setup, maintenance and termination of radio and fixed channels, including handovers. A Mobility Management sublayer manages the location updating and registration procedures and secures the authentication. A Connection Management sublayer handles general call control and manages supplementary services and the short message service. Signaling between different entities such as the Home Location Register (HLR) and Visiting Location Register (VLR) can be accomplished through a Mobile Application Part (MAP) built upon the Transaction Capabilities Application Part (TCAP) of the top layer of the Signaling System No. 7.

A Radio Resources Management (RRM) sublayer can oversee the radio and fixed link establishment between the mobile station and an MSE.

It is also possible to used Enhanced Data Rates for GSM Evolution (EDGE), as an enhancement to General Packet Radio Service (GPRS) networks. EDGE can use 8 Phase Shift Keying (8 PSK) and Gaussian Minimum Shift Keying (GMSK) for different modulation and coding schemes. A three-bit word can be produced for every changing carrier phase. A rate adaptation algorithm can adapt the Modulation and Coding Scheme (MCS) according to the quality of the radio channel and the bit rate and robustness of data transmission. Base stations are typically modified for EDGE use.

Figure 5:
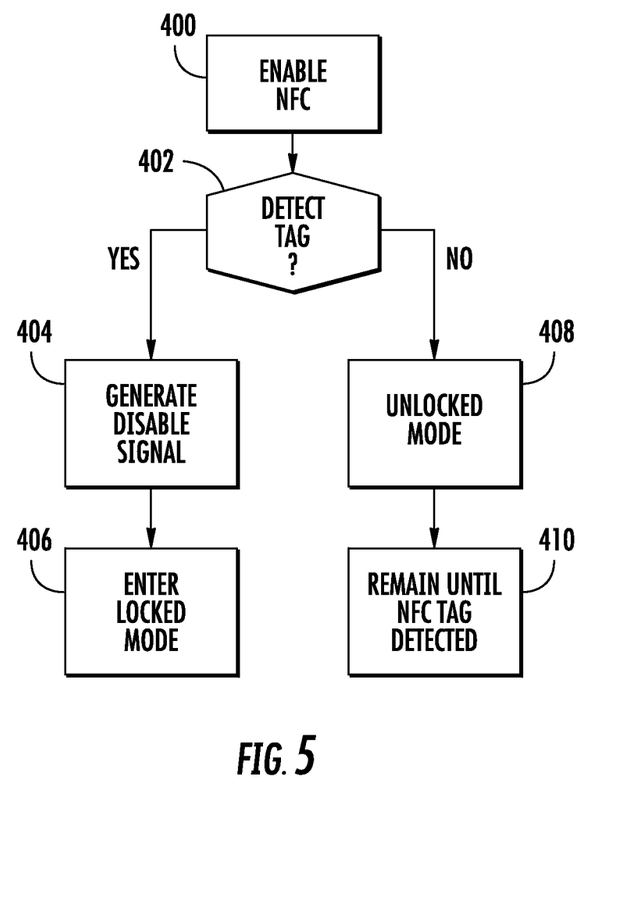
FIG. 5 is a high-level flowchart showing an example of a sequence of operation for the mobile wireless communications device that is responsive to NFC to enter locked or unlocked, operating modes in accordance with a non-limiting example.

FIG. 5 is an example flowchart showing a sequence of steps. The NFC circuit is enabled at intervals to detect the NFC enabled tag (block 400). A decision is made whether the NFC circuit has detected the NFC enabled tag (block 402). If yes, the NFC circuit generates a disable signal to the processor (block 404). The processor causes the device to enter into a locked, operating mode (block 406). If the NFC enable tag is not detected, then the device enters into an unlocked, operating mode (block 408). It remains in this mode until the NFC enabled tag is detected (block 410).

Figure 6:
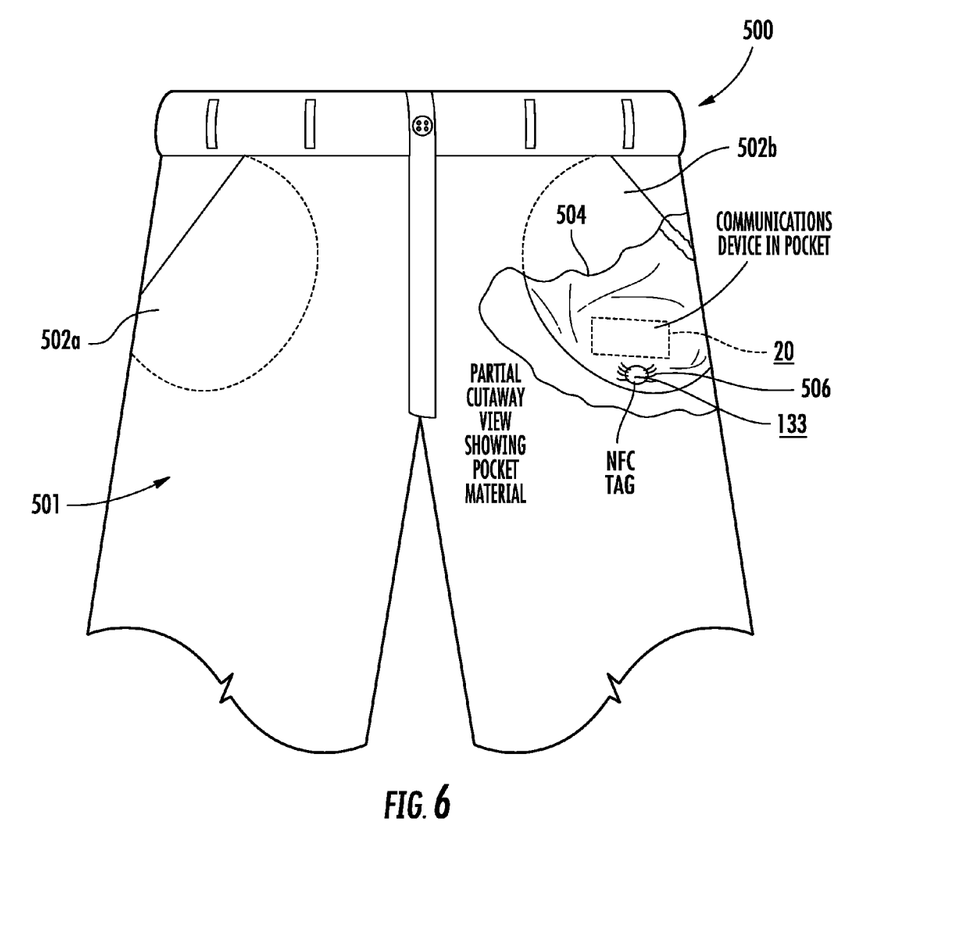
FIG. 6 is a plan view of a pair of pants showing a partial cut-away view of a pocket that includes an NFC enabled tag that is stitched within the pocket and how a communications device can be inserted in the pocket and enter the locked operating mode in accordance with a non-limiting example.

FIG. 6 is an example of an article of clothing 500 that is formed as a fabric 501 that is configured to be worn, and in this non-limiting example, formed as a pair of pants. The article of clothing could be any type of clothing to be worn, including a hat, shirt, jacket such as shown in FIG. 1, pants as shown in FIG. 6, and even socks or shoes or belt. This article of clothing formed as pants includes a device area at which a communications device can be held, which in this particular example, is shown and formed as pockets that are formed as respective left and right pockets 502a and 502b. The pocket 502b is shown in partial cut-away view, showing the pocket material 504 that is formed as an insert as typically pockets are formed. This pocket includes the NFC enabled tag (NFC tag) 133 that is secured within the pocket. In one non-limiting example, the NFC tag 133 is secured by stitches 506. It should be understood that any type of securing mechanism could be used to secure the NFC tag within the pocket. Of course, the NFC tag could be inserted within the pocket and held loosely in the pocket or as part of a fob, such that when the communications device 133 is inserted within the pocket, the NFC circuit of the communications device is enabled. Although the NFC tag 133 is shown secured within the pocket of the pants, it should be understood that depending on how a user may hold the communications device with the article of clothing, the NFC tag can be secured in any location as long as the NFC circuit detects the NFC tag. For example, an NFC tag 133 could be secured on a belt loop or within an inseam or other area of the pants or other article of clothing to be worn.

Figure 7:
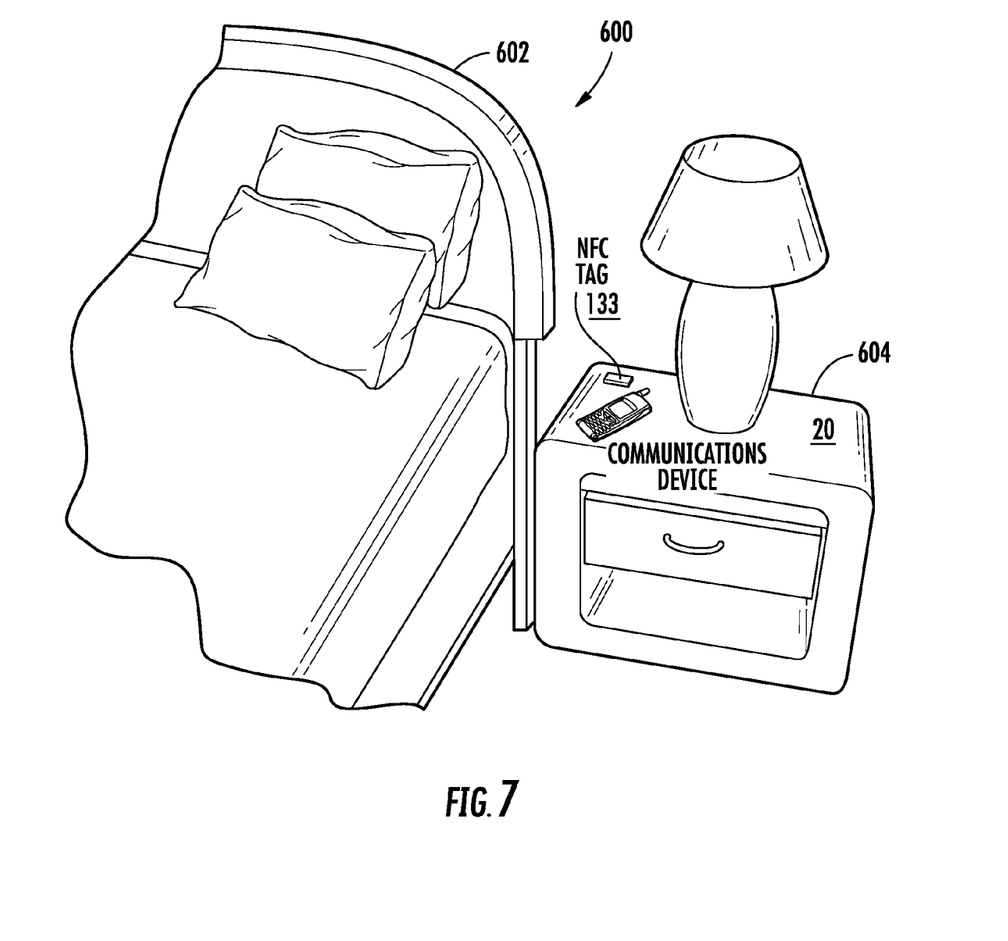
FIG. 7 is an isometric view of a portion of a living area showing a bed and nightstand and NFC enabled tag and communications device.

FIG. 7 is another embodiment and showing a living area 600 that includes a bed 602 and nightstand 604. In this example, the NFC tag 133 is on the nightstand 604 and when a user sleeps at night, they can place the communications device 20 onto the nightstand near the NFC tag 133 such that the communications device detects the NFC tag and can enter the locked, operating mode, which in this example could be a silent operating mode. If the communications device receives a phone call during the night when the user is sleeping, the device remains silent so that the user is not woken at night.

Many modifications and other embodiments will come to the mind of one skilled in the art having the benefit of the teachings presented in the foregoing descriptions and the associated drawings. Therefore, it is understood that the embodiments are not to be limited to the specific embodiments disclosed, and that modifications and embodiments are intended to be included within the scope of the appended claims.

That which is claimed is:

1. A communications device, comprising:
   a housing;
   radio frequency (RF) circuitry and a processor carried by the housing and operative with each other;
   a Near Field Communications (NFC) circuit carried by the housing and connected to the processor and configured to detect an NFC enabled tag using an NFC communications protocol to generate a disable signal to the processor upon detecting the NFC enabled tag, wherein the processor is configured to cause the device to enter a locked, operating mode upon receiving the disable signal and to enter or remain in an unlocked, operating mode if the NFC circuit does not generate the disable signal indicative that the NFC circuit has not detected the NFC enabled tag.

2. The communications device according to claim 1, wherein said NFC circuit includes a timing circuit configured to operate the NFC circuit at intervals to detect the NFC enabled tag.

3. The communications device according to claim 2, wherein said timing circuit is configured to operate the NFC circuit at intervals of about every one to four seconds.

4. The communications device according to claim 1, wherein said housing is configured for handheld operation.

5. The communications device according to claim 1, further comprising a circuit board carried by the housing, wherein said processor is mounted on said circuit board.

6. The communications device according to claim 1, further comprising a circuit board carried by the housing, wherein said RF circuitry is mounted on said circuit board.

7. The communications device according to claim 1, further comprising a circuit board carried by the housing, and wherein said NFC circuit comprises a NFC integrated circuit chip mounted on the circuit board.

8. The communications device according to claim 1, wherein said NFC circuit is configured to detect an NFC enabled tag located in a closed space.

9. The communications device according to claim 8, wherein the closed space corresponds to a pocket in clothing to be worn.

10. The communications device according to claim 1, further comprising an antenna mounted within the housing and connected to the RF circuitry.

11. A method for enabling a communications device to enter a locked, operating mode or an unlocked, operating mode, comprising:
    providing a communications device having a housing and radio frequency (RF) circuitry and a processor carried by the housing and operative with each other and a Near Field Communications (NFC) circuit;
    detecting an NFC enabled tag using an NFC communications protocol; and
    generating a disable signal from the NFC circuit to the processor upon detecting the NFC enabled tag, and the processor causing the device to enter a locked, operating mode after receiving the disable signal.

12. The method according to claim 11, further comprising causing the device to enter an unlocked, operating mode by removing the device away from the NFC enabled tag wherein the NFC circuit does not generate the disable signal indicative that the NFC circuit is not detecting the NFC enabled tag.

13. The method according to claim 11, and further comprising locating the NFC enabled tag in a closed space.

14. The method according to claim 11, further comprising timing operation of the NFC circuit to operate at intervals for detecting the NFC enabled tag.

15. The method according to claim 14, further comprising timing operation of the NEC circuit to operate at intervals of about every one to four seconds.

16. The method according to claim 11, further comprising mounting the RF circuitry on a circuit board carried by the housing.

17. The method according to claim 11, further comprising mounting the processor on a circuit board carried by the housing.

18. The method according to claim 11, further comprising forming the NEC circuit as a NFC integrated circuit chip and mounting the NEC integrated circuit chip on a circuit board.

19. The method according to claim 11, further comprising inserting the device within a pocket of clothing that includes a NFC enabled tag.

20. The method according to claim 11, further comprising mounting an antenna within the housing and connecting the antenna to the RF circuitry.

21. The method according to claim 11, further comprising forming the NFC enabled tag as a key fob.

22. An article of clothing, comprising:
a fabric configured to be worn and having a device area at which a communications device can be held; and
a Near Field Communications (NFC) enabled tag secured onto the fabric in a position that enables the communications device held within the device area to detect the NFC tag using an NFC communications protocol and enter a locked, operating mode.

23. The article of clothing according to claim 22, wherein said device area comprises a pocket formed on the fabric into which the communications device is inserted.

24. The article of clothing according to claim 23, wherein said NFC tag is secured within said pocket.

25. The article of clothing according to claim 22, wherein said fabric is configured as pants having a pocket forming the device area.

* * * * *

UNITED STATES PATENT AND TRADEMARK OFFICE
CERTIFICATE OF CORRECTION

PATENT NO. : 8,526,880 B2  
APPLICATION NO. : 12/713203  
DATED : September 3, 2013  
INVENTOR(S) : Foster et al.

Page 1 of 1

It is certified that error appears in the above-identified patent and that said Letters Patent is hereby corrected as shown below:

Title Page (73)  Delete: "(73) Assignee: Blackberry Limited, Waterloo, Ontario (CA)"

Insert: -- (73) Assignee: BlackBerry Limited, Waterloo, Ontario (CA) --

Signed and Sealed this
Twenty-sixth Day of November, 2013

Margaret A. Focarino
*Commissioner for Patents of the United States Patent and Trademark Office*